(12) United States Patent
Martini et al.

(10) Patent No.: US 6,675,015 B1
(45) Date of Patent: Jan. 6, 2004

(54) APPARATUS, AND ASSOCIATED METHOD, FOR FACILITATING COMMUNICATION HANDOVERS IN A BLUETOOTH-PUBLIC-ACCESS RADIO COMMUNICATION SYSTEM

(75) Inventors: Peter Martini, Bonn (DE); Matthias Frank, Leverkusen (DE); Rolf Göpffarth, Bonn (DE); Wolfgang Hansmann, Bonn (DE)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/396,691

(22) Filed: Sep. 15, 1999

(51) Int. Cl.[7] ................................................ H04Q 7/30
(52) U.S. Cl. ........................ 455/436; 455/561; 455/41.2
(58) Field of Search .......................... 455/41, 436, 437, 455/466, 525, 561; 370/331

(56) References Cited

U.S. PATENT DOCUMENTS

| | | | |
|---|---|---|---|
| 5,717,688 A | * | 2/1998 | Belanger et al. ............ 370/331 |
| 5,949,776 A | | 9/1999 | Mahany et al. ............. 370/338 |
| 6,174,205 B1 | * | 1/2001 | Madsen et al. ............. 439/638 |
| 6,323,775 B1 | * | 11/2001 | Hansson ..................... 340/636 |
| 6,519,457 B1 | * | 2/2003 | Jiang et al. ............. 455/561 X |

FOREIGN PATENT DOCUMENTS

| | | |
|---|---|---|
| EP | 0483544 | 5/1992 |
| WO | WO94/21057 | 9/1994 |

* cited by examiner

*Primary Examiner*—Nay Maung
*Assistant Examiner*—Philip J. Sobutka

(57) ABSTRACT

Apparatus, and an associated method, for facilitating handover of communication in a BLUEPAC (Bluetooth public access) or other radio communication system. Address and timing information associated with potential target base stations is collected and broadcast to mobile devices during operation of the radio communication system. The information is utilized by the mobile device during handover procedures to facilitate efficient handover of communications to a selected target base. In a further implementation, a base station is provided with separate, dedicated transmitters in which a first set of dedicated transmitters is dedicated for setup operations with a mobile device during handover operation and another set of dedicated transmitters is dedicated for regular data communications.

16 Claims, 2 Drawing Sheets

APPARATUS, AND ASSOCIATED METHOD, FOR FACILITATING COMMUNICATION HANDOVERS IN A BLUETOOTH-PUBLIC-ACCESS RADIO COMMUNICATION SYSTEM

The present invention relates generally to communication handovers between base stations of a radio communication system, such as a BLUEPAC (Bluetooth public access) system. More particularly, the present invention relates to a manner by which to facilitate communication handovers of a Bluetooth, or other, mobile device to a target base station. In one implementation, information related to the target base station is provided to the mobile device by the base station with which the mobile device is first associated. In another implementation, separate, dedicated transmitters are provided. A first set of dedicated transmitters is utilized to perform setup operations with the mobile device, and a second set of transmitters is utilized to perform regular data transmissions.

BACKGROUND OF THE INVENTION

New types of communication systems have been made possible as a result of advancements in communication technologies. Such new types of communication systems have generally permitted increased rates of data transmission or made more convenient, or even made possible, the transmission of data.

The advancements in communication technologies have, for example, permitted the introduction, and popularization, of new types of radio communication systems. Radio communication systems are advantageously utilized as communication paths formed during operation thereof include radio links. By utilization of radio links to form at least portions of the communication paths upon which information is communicated, the use of such portions of the communication paths do not require conventional wirelines. Increased communication mobility, relative to conventional wireline communication systems, is thereby generally possible in a radio communication system.

The technology, referred to as Bluetooth, is exemplary of advancements in communication technologies which has permitted new communication possibilities. A BLUEPAC (Bluetooth public access) system is a communication system which utilizes Bluetooth technology. Low power, high-frequency (2.4 GHz) signals are generated to communicate information between a mobile Bluetooth device and a Bluetooth base station. The communication range of a Bluetooth device is relatively small, e.g., in the range of 10 meters. When the Bluetooth device forms a mobile device, network infrastructure, of which a Bluetooth base station forms a portion, must be able to provide for communications with the mobile device to permit the advantages provided by the mobility of the mobile device. Typically, a plurality of base stations are utilized, networked together into a LAN (local area network). Analogous to handover procedures performed in conventional cellular communication systems, handover procedures are defined in a BLUEPAC system as the mobile device moves throughout an area encompassed by the system.

That is to say, when the mobile device leaves a coverage area, i.e., cell, defined by a first base station and enters a coverage area defined by a second base station, handover operations are performed to handover communications from the first base station to the second base station, thereby to permit continued communication activities to be maintained.

Existing procedures by which to perform handovers of communications are less than ideal. Namely, in existing BLUEPAC systems, an inappropriately long period of time might be required for such communications to be "handed-over" from a first base station to a target base station.

In conventional procedures, Bluetooth (BT) baseband protocols are utilized. Using such protocol, the mobile device is required to perform inquiry and page procedures in which inquiry and page scans are performed. During such periods, the affected base stations are not able to perform regular data transmissions to other mobile devices. Also, the timing perimeter of a target base station does not necessarily correspond to the timing perimeter of the base station, and that of the mobile device which is synchronized thereto, from which communications are to be handed-over. Such time differences also might cause a delay in the effectuation of handover of communications to the target base station.

If a manner could be provided by which better to effectuate handover of communications to a target base station in a BLUEPAC, or other radio, communication system, improved communication performance would result.

It is in light of this background information related to radio communication systems that the significant improvements of the present invention have evolved.

SUMMARY OF THE INVENTION

The present invention, accordingly, advantageously provides apparatus, and associated method, by which to facilitate efficient handover of communications of a mobile Bluetooth, or other, device to a target base station. Through operation of an embodiment of the present invention, handover of communications to the target base station are effectuated more quickly than generally permitted utilizing convention techniques, thereby, to improve handover procedures.

An embodiment of the present invention is advantageously implemented in a BLUEPAC (Bluetooth public access) communication system. A BLUEPAC system includes, for instance, a LAN (local area network) including Bluetooth base stations capable of communicating Bluetooth-compatible signals. Each of the base stations define a coverage area within which communications with a mobile Bluetooth device is possible. When the mobile Bluetooth device exits the coverage area associated with one of the base stations and enters the coverage area associated with another of the base stations, communication handover operations are performed. Conventional Bluetooth baseband protocols are utilized to effectuate a hand-off. However, the mobile Bluetooth device does not know the address of the target base station. To determine the address of the target base station, therefore, the mobile device performs an inquiry procedure utilizing a special dedicated inquiry access code reserved for base stations. The inquiry procedure might require a relatively long time period, e.g., several seconds, to be performed. And, once the address of the target base station is obtained by the mobile device, a page procedure must be performed to create a connection with the target base station. Timing disparities between the mobile device and the target base station might further delay, e.g., by several seconds, the creation of the connection.

In one aspect of the present invention, additional information is provided to the mobile Bluetooth device regarding one or more potential target base stations. The information provided to the mobile Bluetooth device facilitates effectuation of communications to a target base station. In one implementation, address information associated with the one or more target base stations is provided to the Bluetooth device. The address information provided to the Bluetooth device by the base station with which the mobile device is associated obviates the conventional requirement that the mobile device perform an inquiry procedure to determine the address of the target base station. In another implementation, timing information associated with one or more target base stations is provided to the mobile device by the base station with which the mobile device is associated. Time delay in creation of a connection with the target base station due to an erroneous estimation of the target base station's timing is reduced.

In another aspect of the present invention, additional transmitters are provided to the Bluetooth base station to facilitate improved rates of connection of a Bluetooth mobile device with the base station. Separate, dedicated, transmitters are provided in which a first set of transmitters which are dedicated to perform connection setup operations. And, at least one additional set of dedicated transmitters is utilized to perform regular data transmissions. Bandwidth available to the transmitters is thereby utilized more efficiently as contrasted to conventional operation of Bluetooth devices required to perform regular page and inquiry scans. Fewer delays associated with performing connection setup procedures and data transmissions result, thereby improving the efficiency of operation of communications in the BLUEPAC communication system.

In a further aspect of the present invention, both the additional information is broadcast to the mobile Bluetooth devices to be used by the Bluetooth devices to facilitate effectuation of communication handover. And, also, separate, dedicated transmitters are provided to the base station, separately to perform the separate connection setup and regular data transmission functions. Amounts of time required to effectuate communication handovers are thereby reduced both because of the transmission of the additional information to the mobile device and due to the use of the separate, dedicated transmitters.

In one implementation, the base station includes apparatus which collects information related to timing perimeters and addresses of neighbor base stations which form target base stations and communication handover operations. Additional apparatus is provided to the base station to convert the collected information into a signal which is broadcast to mobile Bluetooth devices positioned within the coverage area associated with the base station.

In another implementation, apparatus is provided to a mobile Bluetooth device to detect signals generated by a base station with which the mobile device is associated. The signals include information related to one or more potential target base stations to which communications can be handed over in communication handover procedures. The apparatus further includes a storage element at which the informational content of the signal is stored, to be retrieved during handover procedures.

By reducing the amount of time required to effectuate handover of communications, a manner is provided through operation of an embodiment of the present invention to facilitate efficient communication handovers.

In these and other aspects, therefore, apparatus, and an associated method, is provided for facilitating handover of communications in a radio communication system. The radio communication system includes network infrastructure having a first base station and at least a second base station. The first base station defines a first coverage area, and the second base station defines a second coverage area. Each of the first and at least second base stations is selectably operable to communicate with a mobile terminal when the mobile terminal is positioned in a corresponding one of the first coverage area and the second coverage area. Handover of communication occurs when the mobile terminal moves between the first and second coverage areas. An information collector is associated with the first base station. The information collector collects information associated with the second base station during operation of the radio communication system. A collected-information signal generator is coupled to receive the information collected by the information collector. The collected-information signal generator generates and broadcasts a collected-information signal to the mobile terminal to be detectable by the mobile terminal when the mobile terminal is positioned within the first coverage area. The information contained in the collected-information signal is used by the mobile terminal to effectuate handover of communications between the first base station and the second base station.

Also in these and other aspects, apparatus, and an associated method, is provided for a first base station operable in a radio communication system having network infrastructure of which the first base station forms a portion. The first base station defines a first coverage area and is operable to communicate with a mobile terminal when the mobile terminal is positioned in the first coverage area. A first Bluetooth transmitter forms a setup connector capable of performing connection setup operations with the mobile terminal. At least one Bluetooth transmitter is provided to which the mobile terminal is directed subsequent to connection setup operations. The at least one additional Bluetooth transmitter performs regular data transmissions with the mobile terminal.

A more complete appreciation of the present invention and the scope thereof can be obtained from the accompanying drawings which are briefly below the following detailed description of the presently-preferred embodiments of the invention, and the appended claims.

DETAILED DESCRIPTION

Figure 1:
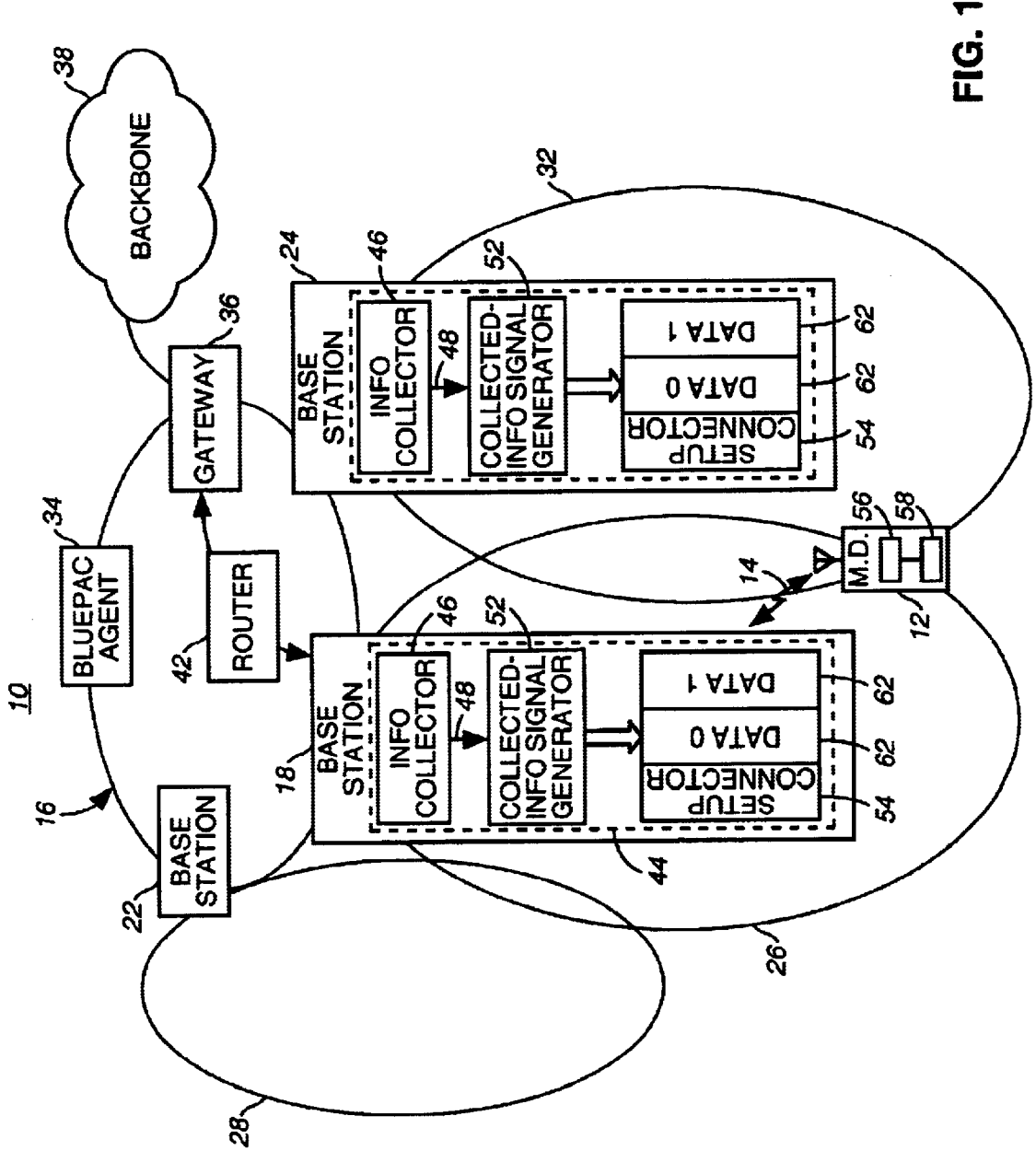
FIG. 1 illustrates a functional block diagram of a BLUEPAC (Bluetooth public access) communications system in which an embodiment of the present invention is operable.

Referring first to FIG. 1, a communication system, shown generally at 10, provides for radio communications with a mobile device 12 by way of a radio-link 14. In the exemplary implementation, the communication system 10 forms a BLUEPAC (Bluetooth public access) communication system. In other implementations, other embodiments to the present invention are similarly possible in other such radio communication systems. Here, the communication system includes a LAN (local area network) portion 16 formed of a plurality of elements networked together. While only a single network loop is illustrated in the Figure to form the LAN, in an actual implementation, the LAN may be comprised of more than one interconnected heterogeneous LANs.

Included amongst the elements of which the LAN 16 is formed are a plurality of Bluetooth base stations, here, a first base station 18, a second base station 22, and a third base station 24. Each of the base stations 18–24 defines a coverage area within which Bluetooth communications with a mobile terminal 12 are effectuable. As shown in the Figure, the mobile device 12 is positioned within a coverage area 26 defined by the first base station 18. Due to the mobility of the mobile device 12, the mobile device is repositionable, later to be positioned at, for instance, a coverage area 28 associated with the second base station 22, or a coverage area 32 associated with the third base station 24. When the mobile device moves out of the coverage area with one of the base stations and into the coverage area associated with another of the base stations, handover of communications must be effectuated so that continued communications with the mobile device can occur. While the existing BLUEPAC communication system provides a manner for handover of communications, significant amounts of delay might result, reducing the efficiency of communications in the communication system.

The LAN 16 is further shown to include a BLUEPAC agent 34 to which the mobile device 12 can be networked together by way of the radio-link 14 and the fixed structure of the LAN and also a gateway 36 which forms a gateway to a public (or other) backbone 38, such as a PSTN (public-switched telephonic network) or internet backbone. Communications are thereby effectuable between a communication station connected by way of the backbone 38 to the LAN 16 by way of the radio-link 14 with the mobile device. The LAN further includes a router 42, effectuable in conventional manner, to route data through the LAN to permit communication of the data with the mobile device.

An embodiment of the present invention is operable to facilitate handover of communications with the mobile device 12 as the mobile device exits a coverage area associated with one of the base stations and enters the coverage area associated with another of the base stations. And, more generally, an embodiment of the invention is operable in any situation in which handover of communications is to be effectuated.

The base station 18 illustrates the functional elements of an embodiment of the present invention. Such elements are also shown to form portions of the base station 24. For purposes of simplicity, such elements are not separately to form. In the exemplary implementation, however, each of the base stations operable in the communication system is operable to perform the functions of the functional elements shown to form portions of the base station 18.

The apparatus 44 of the base station 18 includes an information collector 46 which is operable during operation of the base station to collect information related to others of the base stations. Here, the information collector collects information related to the base station 22 and the base station 24, both neighboring base stations to the base station 18 and each representing a potential target base station to which effectuation of a communication handover might occur. In the exemplary implementation, both address information associated with the respective base stations 22 and 24 and timing parameter information of the timing, i.e., clock, of the respective base stations are collected by the information collector 46.

The information collected by the information collector 46 is provided, here by way of the line 48, to a collected-information signal generator 52. The collected-information signal generator 52 generates a signal of values responsive to the information collected by the information collector 48. The signal generated by the signal generator is broadcast, here by way of a transmitter 54 to be broadcast to the mobile device 12 when positioned in the coverage area 26. The information collected by the information collector and which is utilized to form the collected-information signal is utilized by the mobile device 12 during handover operations to facilitate efficient handover of communications from one base station to another.

In the exemplary implementation in which address information and timing information is collected by the information collector, such information, when received by the mobile device and handover of communications is to be effectuated, is utilized by the mobile device to identify the target base station and to determine corresponding timing synchronization to best effectuate handover. In essence, generation of the collected-information signal and broadcast to the mobile device permit the mobile device to become pre-synchronized to the target base station.

The mobile device 12 is here shown to include a collected-information signal detector 56 for detecting the collected-information signal broadcast by the transmitter 54 and a storage element 58 for storing the informational content of the signal until handover of communications is to be effectuated. Because the timing information and the address information is provided to the mobile device prior to a need for effectuation of a handover, inquiry procedures, conventionally required during handover to ascertain the address of a target base station is obviated. Also, the duration of a paging procedure, also conventionally required in the effectuation of a handover, is minimized as the clock off-set of the target base station which forms the timing information or is ascertainable therefrom, is also named by the mobile device.

The apparatus 44 of the base station 18 is further shown to include a plurality of additional transmitters 62 in addition to the transmitter 54. In the exemplary implementation, the transmitter 54 is utilized as a setup connector operable to perform regular page and inquiry scans while the additional transmitters 62 are operable to perform regular data transmissions. Conventional Bluetooth transmitters, such as the transmitters 54 and 62 are operable to communicate with seven mobile devices. By adding additional transmitters 62, additional communications are effectuable with additional groups of mobile devices to perform regular data transmission therewith. Similar increases are effectuable by increasing the number of transmitters 54.

In operation, the transmitter 54 utilized as a setup connector performs regular paging inquiry scans. After connection has been established between the transmitter 54 and the mobile device 12, the mobile device is redirected to one of the transmitters 62 after which regular data transmissions are possible.

Figure 2:
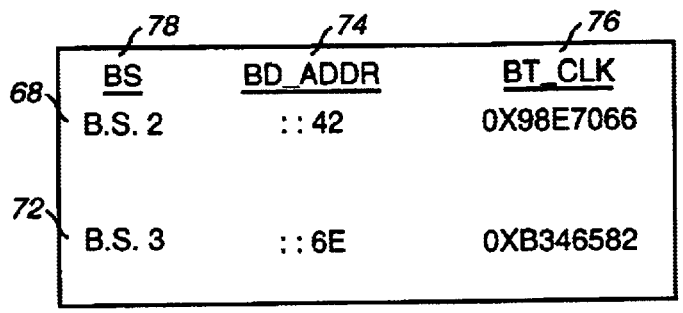
FIG. 2 illustrates a representation of information collected and broadcast by a Bluetooth base station of the BLUEPAC communication system shown in FIG. 1.

FIG. 2 illustrates exemplary information collected by the information-collector 46 forming a portion of an embodiment of the present invention. The information is here illustrated in tabular form in which information associated with the base station 22 is tabulated in a first row 68, and information associated with the base station 24 is tabulated in a second row 72. Information associated with other base stations can analogously be represented. As shown, address information associated with the base stations is tabulated in a column 74, and time clock information associated with each of the base stations is tabulated in a column 76. The information tabulated in columns 74 and 76 is indexed together with the respective base stations identified in the column 78.

The collected-information signal generator 52 (shown in FIG. 1) generates a signal formed of values representative of the information tabulated in the columns 74 and 76 and broadcasts the signal throughout the coverage area encompassed by the base station. Such information, when detected at a mobile device is stored thereat. And, when a communication handover is to be effectuated, such information is retrieved and utilized to facilitate efficient handover of communications between base stations.

Figure 3:
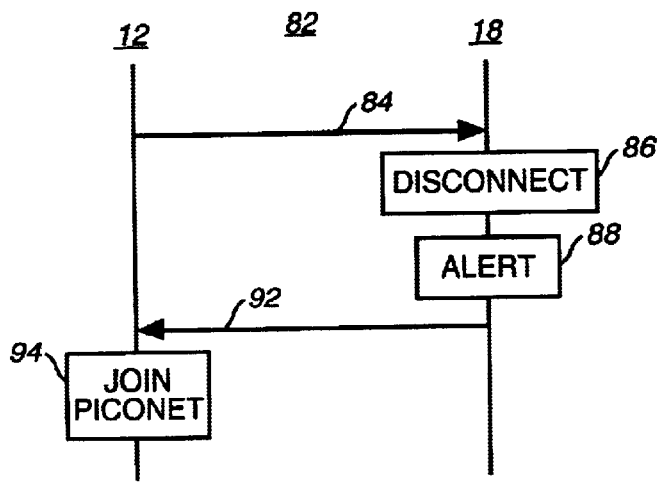
FIG. 3 illustrates a sequence diagram illustrating signals generated during operation of an embodiment of the present invention.

FIG. 3 illustrates a sequence diagram, shown generally at 82, which illustrates signaling between the mobile device 12 and the base station 18 during operation of an embodiment of the present invention. The sequence represents signaling between the mobile device 12 and the base station 18 as the mobile device exits the coverage area 32 and into the coverage area 26, necessitating handover of communications to the base station 18. Information associated with the base station 18, in manners described above, is stored at the memory device 58 (shown in FIG. 1) of the mobile device. Such information is retrieved and utilized to page the base station 18. Segment 84 of the Figure represents paging of the connection setup transmitter 54 by the mobile device. The connection setup transmitter, and associated circuitry forming a connector, is aware of the number of connected mobile devices to transmitter 62 of the base station and selects to which of the transmitters 62 communications with the mobile device should be redirected. Selection is made, and the connection setup transmitter 54 disconnects out of connection with a piconet formed with the mobile device 12, indicated by the block 86. Subsequent to such disconnection, the mobile device 12 enters a page scan state to await a page request from one of the data transmitters 62.

The selected transmitter 62 is alerted, as indicated by the block 88, and the selected transmitter generates a page indicated by the segment 92 to the mobile device. The mobile device 12 thereafter joins the piconet associated with the selected data terminal, as indicated by the block 94.

Thereby, quicker and more efficient, connections to the target base station are possible and the transmitter 54 forming the setup connector is operable only to handle connection setups. As the data transmitter 62 is aware of the address of the mobile device and clock setting, the page procedure performed to page the mobile device is able to be performed much more quickly as contrasted to a conventional page procedure in which there is no knowledge of the relative timing of different base stations. The data transmitters 62 are able to be utilized thoroughly to perform regular data transmissions. Therefore, available bandwidth is used more efficiently in contrast to conventional practice in which Bluetooth devices are required to perform regular page and inquiry scans. And, as a plurality of transmitters 62 are utilized, an increased amount of available bandwidth is available for active members in a piconet formed with mobile devices.

Figure 4:
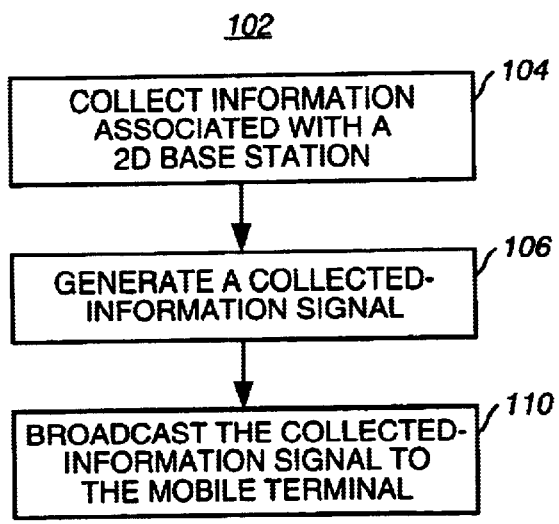
FIG. 4 illustrates a method flow diagram illustrating the method of operation of an embodiment of the present invention.

FIG. 4 illustrates a method, shown generally at 102, of an embodiment of the present invention. The method 102 facilitates handover of communications between the first and second base stations when a mobile terminal operable in a radio communication system is moved between first and second coverage areas. First, and as indicated by the block 104, information associated with the second base station is collected during operation of the radio communication system. Then, and as indicated by the block 106, a collected-information signal is generated which contains information to be used by the mobile terminal to effectuate handover of communications between the first base station and the second base station. And, as indicated by the block 110, the collected-information signal is broadcast to the mobile terminal.

The information broadcast to the mobile terminal is utilized to facilitate efficient handover of communications with the mobile device to a target base station to permit continued communication with the mobile device as the mobile device is positioned throughout an area encompassed by the radio communication system.

The previous descriptions are of preferred examples for implementing the invention, and the scope of the invention should not necessarily be limited by this description. The scope of the present invention is defined by the following claims:

We claim:

1. A radio communication system having network infrastructure including a first base station and at least a second base station, the first base station defining a first coverage area and the second base station defining a second coverage area, each of the first and at least second base stations respectively, selectably operable to communicate with a mobile terminal when the mobile terminal is positioned in a corresponding one of the first coverage area and the second coverage area, the radio communication system comprising apparatus for facilitating handover of communications between the first and second base stations when the mobile terminal moves between the first and second coverage areas, respectively, said apparatus comprising:

an information collector forming part of the network infrastructure and embodied at the first base station, said information collector suitable for collecting information associated with the second base station, the information collected directly from the second base station during operation of the radio communication system, the information associated with the second base station usable by the mobile terminal during effectuation of the handover of communication; and a collected-information signal generator also forming part of the network infrastructure, embodied at the first base station and coupled to receive the information collected by said information collector directly from the second base station, said collected-information signal generator suitable for generating and broadcasting a collected-information signal to the mobile terminal to be detectable by the mobile terminal when the mobile terminal is positioned within the first coverage area, prior to initiation of effectuation of handover of communications, the information contained in the collected-information signal used by the mobile terminal to pre-synchronize the mobile terminal with the second base station, thereby to facilitate subsequent effectuation of handover of communications between the first base station and the second base station.

2. The apparatus of claim 1 wherein the mobile terminal comprises a Bluetooth device capable of communicating Bluetooth signals, wherein the first and at least second base stations comprise stationary Bluetooth devices and wherein the collected-information signal generated by said collected-information signal generator comprises a Bluetooth signal.

3. The apparatus of claim 1 wherein the information collected by said information collector comprises an address which identifies the second base station.

4. The apparatus of claim 1 wherein the information collected by said information collector comprises a clock offset value of the second base station, the clock offset value comprising timing information of a clock.

5. The apparatus of claim 1 wherein the information associated with the second base station collected by said information collector comprises information required of the mobile terminal to effectuate handover of communications between the first base station and the second base station.

6. The apparatus of claim 1 wherein the at least the second base station comprises the second base station and at least a third base station and wherein said information collector is further suitable for collecting information associated with the at least the third base station.

7. The apparatus of claim 6 wherein the collected-information signal generated by said collected-information signal generator further comprises the information associated with the at least the third base station.

8. The apparatus of claim 1 wherein the first and at least second base stations each comprise Bluetooth devices and wherein said apparatus further comprises:
   a first Bluetooth transmitter forming a setup connector capable of performing connection setup operations with the mobile terminal; and
   at least one additional Bluetooth transmitter to which the mobile terminal is redirected subsequent to connection setup operations, said at least one additional Bluetooth transmitter suitable for performing regular data transmissions with the mobile terminal.

9. The apparatus of claim 8 wherein the radio communication system comprises a multi-user communication system having a plurality of mobile terminals and wherein said at least one additional Bluetooth transmitter comprises a plurality of additional Bluetooth transmitters.

10. The apparatus of claim 9 wherein said first Bluetooth transmitter suitable for redirecting a selected mobile terminal of the plurality of mobile terminals to a selected one of said plurality of additional Bluetooth transmitters.

11. The apparatus of claim 9 wherein the connection setup operations performed by said first Bluetooth transmitter which forms the setup connector comprises page scans.

12. The apparatus of claim 9 wherein the connection setup operations performed by said first Bluetooth transmitter comprise inquiry scans.

13. The apparatus of claim 8 wherein the first Bluetooth transmitter is further suitable for detecting a page generated by the mobile terminal and, responsive thereto, and is further suitable for determining to which of said at least one additional Bluetooth transmitter to which the regular data transmissions with the mobile terminal are to be performed.

14. The apparatus of claim 13 wherein said first Bluetooth transmitter is further suitable for informing a selected one of the at least one additional Bluetooth transmitter to which the regular data transmissions are determined to be redirected, and wherein, responsive thereto, the selected one is suitable for paging by the mobile terminal.

15. The radio communication system of claim 1 further characterized by further apparatus, said further apparatus comprising:
   a collected-information signal detector formed at the mobile terminal arid coupled to detect a collected-information signal generated by a selected one of the first base station and the second base station, the collected-information signal containing information associated with an other-than-selected one of the first base station and the second base station; and
   a storage device also formed at the mobileterminal and coupled to said collected-information signal detector, said storage device suitable for storing values representative of the collected-information signals, the values retrievable and used during subsequent handover procedures.

16. A method for communicating in a radio communication system having network infrastructure including a first base station and at least a second base station, the first base station defining a first coverage area and the second base station defining a second coverage area, each of the first and at least second base stations respectively, selectably operable to communicate with a mobile terminal when the mobile terminal is positioned in a corresponding one of the first coverage area and the second coverage area, the method characterized by a method for facilitating handover of communications between the first and second base stations when the mobile terminal moves between the first and second coverage areas, respectively, said method comprising:
   collecting information at the first base station, the information associated with the second base station and collected directly from the second base station during operation of the radio communication system, the information usable by the mobile terminal during effectuation of the handover of communications;
   generating a collected-information signal which contains information to be used by the mobile terminal to effectuate handover of communications between the first base station and the second base station; and
   broadcasting the collected-information signal to the mobile terminal.

* * * * *